Sept. 2, 1969   R. S. MUELLER   3,464,275
SPEED INDICATOR ARRANGEMENT FOR VEHICLE SPEED GOVERNOR
Filed Aug. 26, 1966   3 Sheets-Sheet 1

INVENTOR
ROBERT S. MUELLER
BY HOFFMANN AND YOUNT
ATTORNEYS

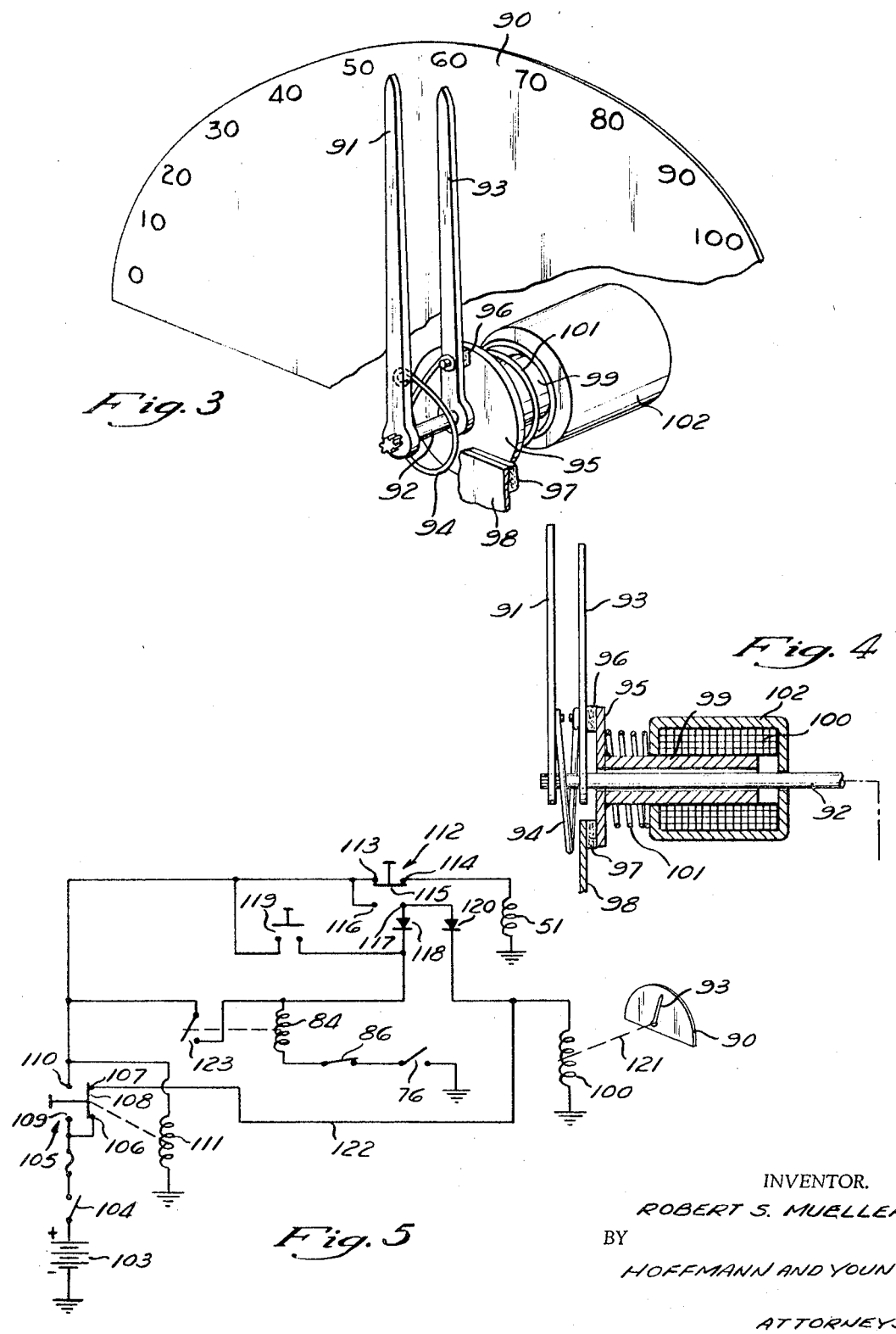

Sept. 2, 1969        R. S. MUELLER        3,464,275

SPEED INDICATOR ARRANGEMENT FOR VEHICLE SPEED GOVERNOR

Filed Aug. 26, 1966        3 Sheets-Sheet 3

INVENTOR.
ROBERT S. MUELLER
BY
HOFFMANN AND YOUNT
ATTORNEYS

United States Patent Office 3,464,275
Patented Sept. 2, 1969

3,464,275
SPEED INDICATOR ARRANGEMENT FOR
VEHICLE SPEED GOVERNOR
Robert S. Mueller, Oak Park, Mich., assignor to Eaton
Yale & Towne Inc., Cleveland, Ohio, a corporation
of Ohio
Filed Aug. 26, 1966, Ser. No. 575,405
Int. Cl. G01p 15/04
U.S. Cl. 73—491                     16 Claims

ABSTRACT OF THE DISCLOSURE

A speedometer carries two indicators connected to each other by a flexible coupling. When a vehicle speed governor is set, one indicator is locked in place to indicate the speed at which the governor is set and the other indicator remains free to indicate vehicle speed.

---

This invention relates to a speed indicator arrangement for indicating the vehicle speed which a speed governor for the vehicle has been set to maintain.

Various speed governors have been proposed heretofore for use on automotive vehicles to hold the vehicle at a predetermined speed, selected by the driver, without requiring the driver to keep his foot on the accelerator pedal. The convenience and other advantages of such speed governors are well recognized.

The present invention is directed to a novel indicator arrangement for use on the speedometer of a vehicle equipped with a speed governor to provide a continuing indication of the vehicle speed which the governor has been set to maintain. The present indicator arrangement comprises an auxiliary pointer on the speedometer which is yieldably coupled to the main pointer on the speedometer so as to normally follow the latter's movements, and means for locking the auxiliary pointer against movement when the driver puts the speed governor into operation to maintain the vehicle at the speed which it then has. The auxiliary pointer, when so locked, provides a continuing indication of the speed for which the governor has been set and it will maintain this indication despite changes in the actual vehicle speed, such as if the driver overrides the governor long enough to pass another vehicle or applies the brake to slow down his vehicle.

Accordingly, it is the principal object of this invention to provide a novel and improved indicator arrangement for providing a continuing indication of the vehicle speed which has been set by a speed governor.

Another object of this invention is to provide such an indicator arrangement which includes an auxiliary pointer on the speedometer which normally follows the main pointer on the speedometer and which is locked against continued movement when the driver sets the vehicle speed for the governor to maintain.

Another object of this invention is to provide such an indicator arrangement in which the auxiliary pointer is under the control of a brake coil which is connected in the electrical control circuit of the speed governor so that the auxiliary pointer is released for movement with the main pointer on the speedometer before the governor speed is set by the driver and is locked against further movement when the driver sets the governor speed.

Further objects and advantages of the present invention will be apparent to those skilled in the art to which it relates from the following detailed description of two presently-preferred embodiments thereof made with reference to the accompanying drawings forming a part of this specification and in which:

FIGURE 3 is a fragmentary schematic perspective view illustrating a first embodiment of the present speed indicator arrangement on the speedometer of a vehicle having the speed governor of FIGS. 1 and 2;

FIGURE 4 is a longitudinal section through the FIG. 3 speed indicator arrangement;

FIGURE 5 is a schematic circuit diagram showing the electrical control circuit of the speed governor and the speed indicator arrangement of FIGS. 3 and 4;

Figure 2:
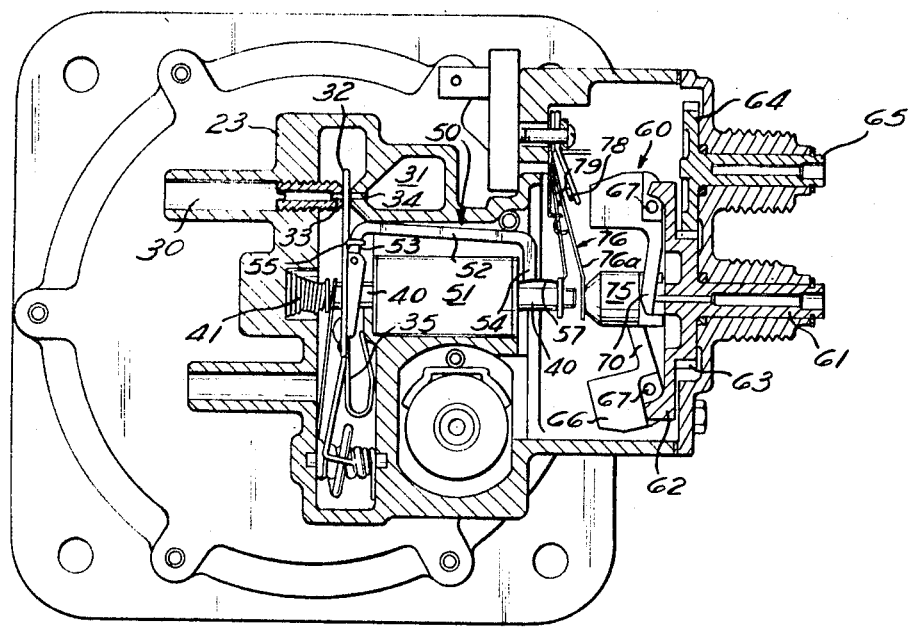
FIGURE 2 is an enlarged fragmentary section through a portion of this speed governor, taken generally along the line 2—2 in FIG. 1.
Figure 1:
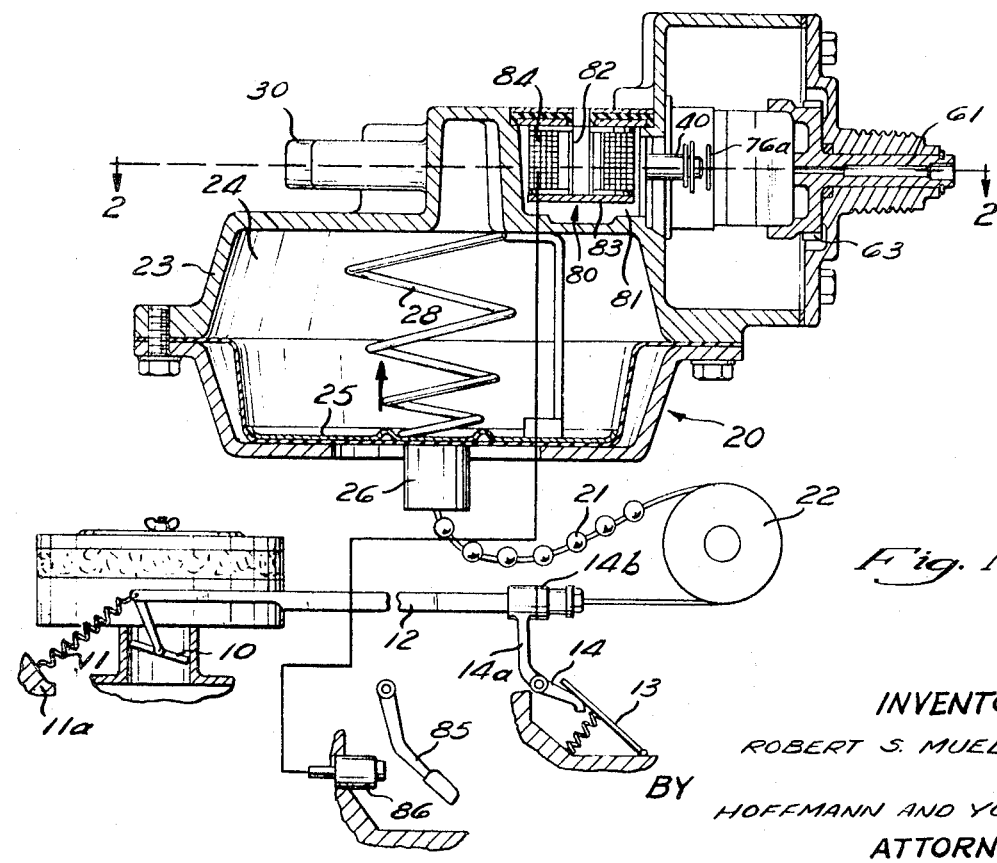
FIGURE 1 is a schematic view illustrating a vacuum-operated speed governor with which the speed indicator arrangement of the present invention may be used.

FIGURES 1 and 2 illustrate a preferred form of vacuum-operated vehicle speed governor with which the present invention may be used. As shown in FIG. 1, the governor is used for controlling the position of a throttle control member 10 of the automotive vehicle in which the speed governor is utilized. The throttle control member 10 is movable from a closed position, illustrated in FIG. 1, to a fully open position in a throttle opening direction for increasing the vehicle speed and is moved in the reverse direction to a closed position for decreasing vehicle speed. The throttle member 10 is biased to its closed position by a spring 11, one end of which engages a suitable fixed support member 11a and the other end of which engages one end of a rod 12 which is connected to the throttle member 10. The rod 12 is connected to the throttle member 10 so as to effect movement of the throttle member 10 between its positions upon linear movement thereof. As viewed in FIG. 1, when the rod 12 moves to the right, the throttle member 10 moves in its throttle opening direction and when the rod member 12 moves to the left, the throttle member 10 moves in a throttle closing direction.

The rod 12 is, as noted above, biased by the spring 11 to the left and is moved to the right by depression of the accelerator pedal 13 of the automotive vehicle. As the accelerator pedal 13 is depressed, the spring 11 applies a greater force tending to bias the rod 12 against movement by the accelerator pedal. The accelerator pedal 13, when depressed by the operator's foot, actuates a bell crank link member 14 in the embodiment shown in FIG. 1, and effects movement of the arm 14a thereof, which forms a part of the link 14, toward the right. The arm 14a is slidably mounted on the rod 12 and engages a collar 14b thereon to effect movement of the rod 12 toward the right when the arm moves toward the right, thereby effecting movement of the throttle member 10 in a throttle opening direction.

The throttle 10 also may be moved in its throttle opening direction by means of a speed governor unit 20 which is operatively connected to the rod 12 by means of a flexible chainlike member 21. The chain member 21 is trained around suitable pulleys, such as 22, to effect movement of the rod 12 upon actuation of the speed governor unit 20. The speed governor unit 20 is of the so-called vacuum type and includes a housing 23 which defines in part a vacuum chamber 24, and supports a flexible diaphragm 25 which forms a wall of the vacuum chamber 24. The diaphragm 25 is connected by means of a suitable clip 26 to the end of the chain member 21 opposite the end connected with the rod 12. Movement of the flexible diaphragm 25 in the direction of the arrow, shown in FIG. 1, is in the direction to effect movement of the rod 12 toward the right, as viewed in FIG. 1, through the chain connection 21 and movement of the throttle member in its throttle opening direction.

The diaphragm 25 is moved in the direction of the arrow shown in FIG. 1 in response to the creation of a vacuum in the vacuum chamber 24 and is biased to its position shown in FIG. 1 by means of a suitable spring 28 and spring 11. When the vacuum in the chamber 24 and the force applied by springs 11 and 28 balance, the diaphragm stops moving and is in an equilibrium condition. If the vacuum is then either increased or decreased, the diaphragm will move. If the vehicle speed decreases, as when the vehicle goes up a hill, the vacuum will increase to move the diaphragm to increase the throttle opening. If the vehicle speed increases, as when the vehicle goes down a hill, the vacuum will decrease and the diaphragm will move so that the spring 11 will decrease the throttle opening.

The vacuum in the vacuum chamber 24 is provided through a suitable vacuum connection 30 (FIG. 2) in the housing 23 which is connected by suitable conduits, not shown, to the intake manifold of the vehicle to apply a vacuum thereat. The chamber 24 also communicates with the atmosphere through a suitable connection 31 (FIG. 2), spaced slightly from the vacuum connection 30 and opposite thereto.

The vacuum in the chamber 24 is controlled by a valve member or flapper member 32 (FIG. 2) which controls the amount of communication between the vacuum connection 30 and atmosphere connection 31 and the chamber 24. The valve or flapper member 32 is an elongated member which extends between nozzlelike openings 33, 34 connecting the vacuum and atmospheric connections 30, 31 with the chamber 24. The flapper member 32 is movable relative to the nozzle openings 33, 34 and, when positioned adjacent to the nozzle opening 33 it substantially blocks communication between the vacuum conduit 30 and the vacuum chamber 24, and the chamber 24 thus is at substantially atmospheric pressure and the diaphragm member 25 is in the position shown in FIG. 1. When the flapper member 32 moves away from the nozzle 33, the vacuum connection 30 then communicates with the chamber 24 and a vacuum is established therein causing the diaphragm member 25 to move in its throttle opening direction (upward in FIG. 1) to effect opening movement of the throttle member 10. The flapper member 32 specifically is a flat strip member which extends between the adjacent nozzles 33 and 34, respectively, and is biased by a suitable leaf spring 35 (FIG. 2) into engagement with the nozzle 33, thereby blocking communication between the vacuum connection 30 and the chamber 24.

The flapper member 32 is moved to the right, as viewed in FIG. 2, when the speed governor unit 20 is actuated in response to a decrease in vehicle speed. When this occurs, a vacuum is established in the chamber 24 in accordance with the amount of movement of the flapper member. This causes movement of the diaphragm member 25 in its throttle opening direction to hold the vehicle speed near the desired speed. The movement of the flapper member 32 is effected in response to movement of a core member 40, which moves right and left, as viewed in FIG. 2, in response to changes in vehicle speed. The core member 40 moves to the left, as viewed, in FIG. 2, upon an increase in vehicle speed, and moves to the right, as viewed in FIG. 2, upon a decrease in vehicle speed, as will be described in detail hereinbelow. The left end of the core member, as viewed in FIG. 2, extends slidably through an opening in the flapper member 32. A suitable spring member 41 is supported in the housing 23 and engages the left end of the core member 40, as viewed in FIG. 2, and biases the core member 40 to the right.

The speed governor unit 20 includes a locking mechanism 50 for locking the core member 40 to the flapper member 32 to cause these members to move together so that when the core member moves in response to vehicle speed, the flapper member 32 likewise moves. The locking mechanism 50 includes an electrical coil 51, positioned encircling the core member 40. A suitable locking bracket member or link member 52 straddles the coil 51 end-to-end and is engageable with the core member 40 at the opposite axial ends of the coil 51. The link member 52 is U-shaped and the legs 53 and 54 of the link member 52 are positioned at the opposite ends of the coil 51 and the extreme ends of the legs 53, 54 bear against the core member 40 when the coil 51 is energized.

The leg 53 of the link 52 intermediate its ends is pivotally supported by a cross pin carried by the flapper member 32. A spring wire member 55 couples the leg 53 of link member 52 resiliently to the flapper member 32.

In order to lock the core member 40 to the flapper member 32, the coil 51 is energized causing movement of the link 52 by magnetic attraction clockwise from the FIG. 2 position. Because of the construction and arrangement of the flapper member 32, core 40, and link 52, when the coil 51 is energized, the lower end of the leg 53 of the link 52 first locks to the core member 40 and becomes a temporary fulcrum for the link 52, and the flapper member 32 and the link 52 pivot as a unit. The flapper member 32, due to the pivoting movement, moves from contact with the nozzle 33 and moves to a position located a distance from the nozzle 33 to have the appropriate vacuum applied in the chamber to hold the throttle member at the desired speed.

The link 52 then pivots about the pivot pin carried by the flapper member 32, with its opposite leg 54 moving down toward the core 40 to lock the latter to the flapper member 32. Thus, with the core member 40 locked to the flapper member 32 through the energization of the coil 51, upon a decrease in vehicle speed the flapper will move to the right, as viewed in FIG. 2, in unison with the core member 40. This causes movement of the flapper 32 from its position in a direction away from the vacuum nozzle 33 and effects greater communication of the vacuum nozzle 33 with the vacuum chamber 24 and effects the creation of a greater vacuum in the chamber 24 and movement of the diaphragm 25 in its throttle opening direction.

When the coil 51 is de-energized, the spring wire 55 tends to return the link 52 to the position illustrated in FIG. 2. A suitable leaf spring 57, shim, or other spacing means is preferably provided on the core and engages lower end of the leg 54 of the link 52 to assist in moving the link 52 from the locking position back to the position shown in FIG. 2. The spring 57, however, does not interfere with the locking of the link 52 to the core 40.

As already pointed out, the vacuum in the vacuum chamber 24 is controlled, when the electrical coil 51 is energized, by movement of the flapper 32 relative to the vacuum nozzle 33 upon movement of the core member 40. The core member 40 is moved in response to increases and decreases in speed of the vehicle by means of a vehicle speed sensing mechanism, generally designated 60. The mechanism 60 senses the speed of the vehicle and effects movement of the core member 40 in response to changes in the speed. The mechanism 60 includes a suitable input drive connection 61 that can be connected with the transmission or front wheel of the vehicle and is driven at a speed in proportion to the speed of the vehicle. The connection 61 is a projection of a drive carriage 62 which has a gear portion 63. The gear portion 63 thereof meshes with a gear 64 having a shaft portion 65 connected thereto and which shaft portion is adapted to be connected with the usual speedometer pointer of the vehicle.

The carriage 62 carries a plurality of weight members 66 which are pivotally supported on the carriage 62 by means of suitable pins 67 which extend through the weights and through suitable projecting portions of the carriage 62. The weights 66 have arm portions 70 which extend toward the axis of rotation of the carriage 62 and into notches in a suitable drive coupling 75. The drive coupling 75 is rotated by the arm portions 70 of the weights upon rotation of the weight members 66 and is movable axially upon movement of these arm portions axially. The arm portions 70 of the weight members 66 move axially due to centrifugal force upon changes in the speed of rotation of the carriage 62 which occurs when vehicle speed varies.

The drive coupling 75 of the speed sensing mechanism engages the operator 76a of a minimum speed switch 76 having normally-open contacts 78 and 79. Preferably, switch 76 is an over-center, snap-acting switch whose contacts will be closed when the vehicle speed increases to a predetermined minimum value, such as 25 miles per hour, and will remain closed until the vehicle speed drops a few miles per hour below this switch-closing speed, such as to 20 miles per hour. As explained in detail hereinafter, switch 76 functions as a minimum speed switch which will prevent the speed governor unit 20 from being used unless the vehicle speed is above the minimum value.

The speed governor unit 20 also has a vacuum release valve 80 (FIG. 1) mounted in a recess 81 in the governor housing 23 which is in communication with the vacuum chamber 24. This release valve has a passage 82 whose upper end is open to the atmosphere and whose lower end faces toward the recess 81. A valve plate 83 is pivotally supported for movement toward and away from a valve seat at the lower end of this passage. A spring (not shown) biases this valve plate to a position away from the valve seat, so as to connect the atmosphere passage 82 to the vacuum chamber 24 and thereby render the governor unit 20 ineffective to control the vehicle speed. The release valve is provided with an electrically energizable coil 84 for attracting the valve plate 83 magnetically into sealing engagement with this valve plate 83 magnetically into sealing engagement with valve seat so as to block the atmosphere passage 82 from the vacuum chamber 24, thereby permitting the governor unit 20 to be operable to control the vehicle speed.

At the brake pedal 85 of the vehicle (FIG. 1) a normally-closed brake pedal switch 86 is positioned to be opened when the brake pedal is depressed to apply the brake. This switch 86 is connected to the coil 84 of the vacuum release valve 80 to provide an initial energization circuit for this coil, as explained hereinafter.

With the foregoing in mind as a suitable environment in which the present invention may be used, reference will now be made to FIGS. 3–5, which illustrate a first embodiment of the present invention.

Referring to FIG. 3, the vehicle has a speedometer with a dail 90 and a conventional main pointer or needle 91 mounted on a rotatable shaft 92, whose rotational position is determined by the vehicle speed, such as through a coupling to the previously-mentioned shaft 65 at the speed-sensing mechanism 60. The main pointer 91 of the speedometer indicates the vehicle speed in the usual manner.

In accordance with the present invention, the speedometer is also provided with an auxiliary pointer or needle 93 which is freely pivoted on shaft 92 behind the main pointer 91. A torsion spring 94 has its opposite ends connected to the two pointers and it provides a yieldable coupling between them for normally causing the auxiliary pointer 93 to be aligned with the main pointer 91 and to follow the latter as it is turned by shaft 92 to a rotational position corresponding to the actual speed of the vehicle.

A spring-applied, solenoid-released brake is provided for holding the auxiliary pointer 93 against rotation with the main pointer 91 of the speedometer. This brake comprises a brake disc 95 which is engageable simultaneously with a pad 96 of friction material attached to the back of the auxiliary pointer 93 and with a pad of friction material 97 attached to a fixed reaction member, such as a wall 98. The disc 95 is attached to a slidable core or armature 99 of magnetically attractable material which extends into a solenoid coil 100 and is inductively coupled to the latter. A coil spring 101 is engaged under compression beween the housing 102 for the solenoid coil and the back of brake disc 95.

When solenoid coil 100 is de-energized, the spring 101 urges the core 99 to its extended position, in which the brake disc 95 is held in torque-sustaining, frictional engagement with the friction pads 96, 97 to hold the auxiliary pointer 93 against turning in unison with the main pointer 91 of the speedometer. However, when the solenoid coil 100 is energized it pulls in the core 99 and retracts the brake disc 95 away from the friction pads 96, 97, thereby releasing the auxiliary pointer 93 to follow the main pointer 91 of the speedometer under the urging of the yieldable spring coupling 94 acting between them.

FIGURE 5 illustrates schematically the electrical control circuit for the governor which includes the brake coil 100, as well as the previously-mentioned minimum speed switch 76, the brake pedal switch 86, the coil 84 of the vacuum release valve 80 in the governor, and the coil 51 of the locking mechanism in the governor. This control circuit includes the vehicle battery 103 and a normally-open ignition switch 104. A manually operable control switch 105 is connected between the ignition switch 104 and the remainder of the circuit. Control switch 105 has a first set of fixed contacts 106, 107 which are normally engaged by the mobile contact 108, and a second set of fixed contacts 109, 110 which are normally open. A holding coil 111, connected between switch contact 110 and ground, is inductively coupled to the mobile contact 108 to hold the latter against the normally-open fixed contacts 109, 110 after contact 108 has been manually moved into engagement with contacts 109, 110 to energize coil 111.

The energization of the lock-in coil 51 is under the control of a speed set switch 112 having a first set of fixed contacts 113, 114, which are normally engaged by the mobile contact 115, and a second set of normally-open switch contacts 116, 117, which are engaged by the mobile contact 115 when switch 112 is operated manually by the driver. The lock-in coil 51 is energized when ignition switch 104 is closed and the control switch 105 is operated to position its mobile contact 108 closed on its fixed contacts 109, 110, and the speed set switch 112 is in its normal position, with its mobile contact 115 engaging the fixed contacts 113, 114.

The brake coil 100 is connected by a line 122 to be energized through the normally-closed contacts 106–108 of the control switch 105.

A first rectifier diode 118 is connected between the normally-open fixed contact 117 of speed set switch 112 and the coil 84 for the vacuum release valve. A normally-open speed resume switch 119 is also connected to coil 84 across the normally-open contacts of the speed set switch 112 and diode 118.

A second rectifier diode 120 is connected between the normally-open fixed contact 117 of the speed set switch 112 and the brake coil 100 associated with the auxiliary pointer 93 of the speedometer. Thus, the second rectifier diode 120 is connected in series between the first rectifier diode 118 and the brake coil 100 and in this series circuit its polarity is opposite to that of the first rectifier diode 118. The second rectifier diode 120 prevents energization of the coil 84 for the vacuum release valve 80 in the governor unit 20 through the normally-closed contacts 106–108 of the control switch 105 and line 122.

The first rectifier diode 118 is connected (through the second rectifier diode 120) between the speed resume switch 119 and the brake coil 100, and its polarity is such that it prevents the brake coil 100 from being energized through the speed resume switch 119 when the latter is closed.

The coupling between the brake coil 100 and the auxiliary pointer 93 is indicated schematically by the dashed line 121 in FIG. 5, but it will be understood that the actual coupling between them may be essentially similar to the arrangement shown in FIGS. 3 and 4, such that when coil 100 is energized the auxiliary pointer 93 is free to follow the main pointer 91 of the speedometer, as described.

The coil 84 of the vacuum release valve has a set of normally-open holding contacts 123 which are arranged to be closed in response to the initial energization of coil 84 and which, when closed, provide a holding circuit for maintaining coil 84 energized as long as the minimum speed switch 76, the brake pedal switch 86 and the normally-open contacts 108–110 of control switch 105 remain closed.

In the operation of this circuit, before the ignition switch 104 is closed the control switch 105 will be in its normally-closed position, the speed-set switch 112 will be in its normally-closed position, the speed resume switch 119 will be in its normally-open position, the brake pedal switch 86 will be in its normally-closed position, and the minimum speed switch 76 will be in its normally-open position, all as shown in FIG. 5.

When the ignition switch 104 is closed to start the vehicle engine, the brake coil 100 will be energized immediately via the normally-closed contacts 106–108 of control switch 105 and line 122. Such energization of coil 100 will release the brake 95–98 for the auxiliary pointer 93, permitting the latter to follow the movement of the main pointer 91 of the speedometer as the vehicle speed increases.

After the vehicle has passed the minimum closing speed for switch 76 and has reached the speed which the driver wants to maintain by means of the governor, he operates the control switch 105 to close its normally-open switch contacts 108–110. This completes an energization circuit for holding coil 111, which now maintains contacts 108–110 closed until the driver decides to manually reset switch 105 to its normal position. Such operation of switch 105 de-energizes the brake coil 100, so that the spring-applied brake 95–98 now locks the auxiliary pointer 93 against movement so that it cannot continue to follow the main pointer 91 of the speedometer. Also, this operation of control switch 105 completes an energization circuit for the lock-in coil 51 through the normally-closed contacts 113–115 of the speed set switch 112. Such energization of the lock-in coil 51 causes the core member 40 to be locked to the flapper member 32 in the speed governor unit 20, as described. However, the speed governor unit itself is not yet operative to control the vehicle speed because the coil 84 of the vacuum release valve 80 is not yet energized and this valve 80 is open to connect the vacuum chamber 24 to the atmosphere.

To put the governor in operation, the driver now operates the speed set switch 112 to close its normally-open contacts 115–117 long enough to complete an energization circuit for the release valve coil 84 through the first diode 118. This energization of coil 84 causes the vacuum release valve 80 to close, as described, so that the governor unit 20 may be effective to control the vehicle speed. Coil 84 also closes its holding contacts 123 to establish a holding circuit for coil 84, independent of the speed set switch 112. Also, such operation of the speed set switch 112 completes an energization circuit for the brake coil 100 through the second diode 120, so that now the auxiliary pointer 93 is released to follow again the movement of the main pointer 91 of the speedometer.

When the driver releases the speed set switch 112, its contacts 113–115 close again to energize the hold-in coil 51 and to de-energize the brake coil 100 for the auxiliary pointer 93. Consequently, the spring-applied brake 95–98 will lock the auxiliary pointer 93 against continued movement along with the main pointer 91 of the speedometer, and pointer 93 now provides a continuing indication of the vehicle speed which the governor has been set by the driver to maintain. The energization of the lock-in coil 51 causes the core 40 to be locked to the flapper member 32, so that the speed governor unit 20 now regulates the vehicle speed. The coil 84 for the vacuum release valve remains energized through its holding contacts 123.

If the vehicle driver depresses the brake pedal 85 to slow down the vehicle, this will open the normally-closed brake pedal switch 86 and will de-energize the coil 84 of the vacuum release valve 80 so as to render the governor inoperative to control the vehicle speed. If, however, the vehicle speed has not yet dropped below the opening speed for the minimum speed switch 76 and the driver now releases the brake pedal 85, the brake pedal switch 86 will re-close. The driver may re-establish the control of the speed governor over the vehicle speed by closing the resume speed switch 119, which completes an energization circuit for coil 84 without requiring operation of the speed set switch 112 again.

Figure 6:
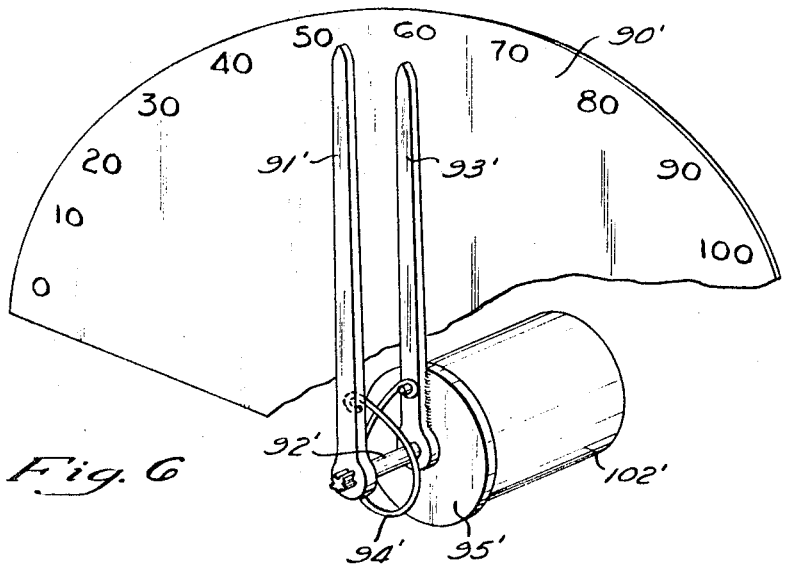
FIGURE 6 is a fragmentary schematic perspective view illustrating a second embodiment of the present speed indicator arrangement on the speedometer of a vehicle having the speed governor of FIGS. 1 and 2.
Figure 7:
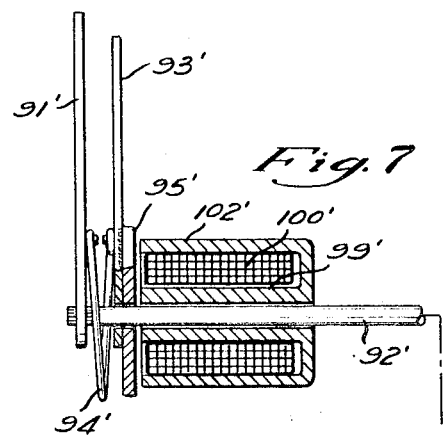
FIGURE 7 is a longitudinal section through the FIG. 6 speed indicator arrangement.
Figure 8:
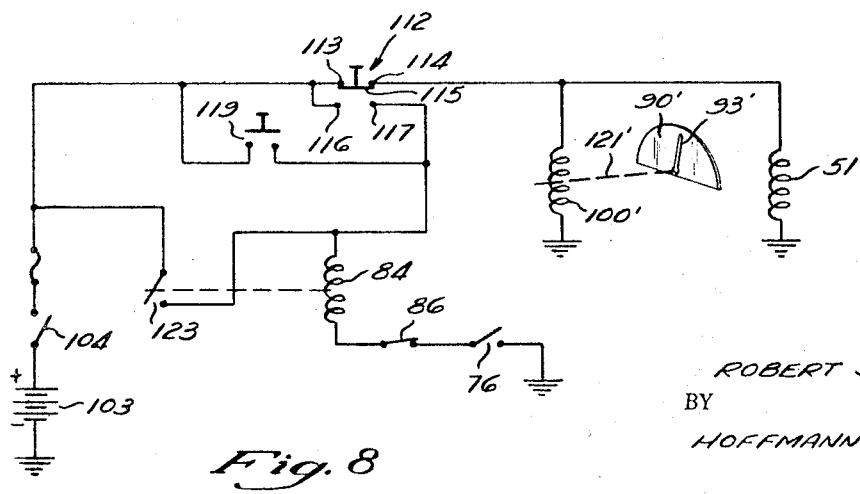
FIGURE 8 is a schematic circuit diagram of the electrical control circuit of the speed governor and the speed indicator arrangement of FIGS. 6 and 7.

FIGURES 6–8 show a second embodiment of the present invention which is adapted for use with a speed governor of the type shown in FIGS. 1 and 2. Elements of this embodiment which correspond to those of the embodiment of FIGS. 5–7 are given the same reference numerals, with a "prime" suffix added, and the detailed description of these elements will not be repeated.

The auxiliary pointer 93′ of the speedometer is attached to a brake disc 95′ in an electrically-applied brake. Disc 95′ is a magnetically attractable armature operated by the solenoid coil 100′ in this brake. When coil 100′ is de-energized, the auxiliary pointer 93′ and disc 95′ will rotate freely on shaft 92′, following the rotation of the main pointer 91′ due to the spring 94′ acting between them. Conversely, when coil 100′ is energized, it pulls in the disc 95′ until it abuts frictionally against the adjacent end faces of the solenoid housing 102′ to brake the auxiliary pointer 93′, so that it cannot continue to turn with the main pointer 91′ of the speedometer.

Referring to FIG. 8, in the control circuit the brake coil 100′ is connected in parallel with the lock-in coil 51 of the governor unit 20. The remaining elements of the FIG. 8 circuit are the same as the correspondingly numbered elements of the FIG. 5 circuit, and they are connected in the circuit in the same way.

In the operation of the FIG. 8 circuit, when the ignition switch 104 is closed to start the vehicle engine, the brake coil 100′ and the lock-in coil 51 will both be energized from the battery 103 through the normally-closed contacts 113–115 of the speed set switch 112. This energization of the brake coil 100′ will lock the auxiliary pointer 93′ against turning along with the main pointer 91′ of the speedometer. The energization of the lock-in coil 51 causes the core 40 to be locked to the flapper member 32 in the speed governor unit 20, as described. However, the speed governor unit itself is not yet operative to control the vehicle speed because the coil 84 of the vacuum release valve 80 is not yet energized, so that the vacuum chamber 24 is connected to the atmosphere.

After the vehicle has passed the minimum closing speed for switch 76 and has reached the speed which the driver wants to maintain with the governor, the driver may operate the speed set switch 112 to close its normally-open contacts 115–117 long enough to de-energize the previously-energized coils 51 and 100′ and to complete an initial energization circuit for coil 84 of the vacuum release valve 80. Consequently, the core 40 is released from the flapper member 32 in the speed governor unit 20, and the auxiliary pointer 93′ is released so that it can follow the movement of the main pointer 91′ due to the spring 94′ acting between them. The energization of coil 84 causes its normally-open holding contacts 123 to close, completing a holding circuit for maintaining coil 84 energized independent of the speed set switch 112.

When the driver now releases the speed-set switch 112, its contacts 113–115 close again to re-energize the hold-in coil 51 and the brake coil 100' for the auxiliary pointer 93'. Coil 100' will retract its disc 95' and consequently the frictional, braking engagement between the brake disc 95' and the end of the solenoid housing 102' will lock the auxiliary pointer 93' against continued movement in unison with the main pointer 91' of the speedometer. The auxiliary pointer 93' now provides a continuing indication of the vehicle speed which the governor has been set by the driver to maintain. The energization of the lock-in coil 51 causes the core 40 to be locked to the flapper member 32 in the speed governor unit 20, so that the governor unit now regulates the vehicle speed. The coil 84 of the vacuum release valve 80 remains energized through its holding contacts 123.

Operation of the brake pedal 85 to apply the brake will open the normally-closed brake pedal switch 86 to de-energize the coil 84 of the vacuum release valve 80, thereby rendering the governor unit 20 inoperative to control the vehicle speed. If the vehicle speed has not dropped below the minimum speed at which switch 76 will re-open, and the driver now releases the brake pedal 85, the driver may re-establish the speed governor's control over the vehicle speed by closing the normally-open speed resume switch 119, which re-energizes the coil 84 of the vacuum release valve without having to operate the speed set switch 112 again.

In either the embodiment of FIGS. 3–5 or the embodiment of FIGS. 6–8, the driver can change the governor speed setting simply by driving the vehicle at the new speed which he wants the governor to maintain and operating the speed set switch 112 to close its contacts 115–117 long enough to de-energize the lock-in coil 51 and to release the brake for the auxiliary pointer 93 or 93'. The auxiliary pointer will align itself with the main pointer 91 or 91', which is indicating the new vehicle speed. Then, when the operator causes the speed set switch 112 to re-close its contacts 113–115, the governor will be locked in at this speed and the auxiliary pointer 93 or 93' will be locked against movement and will therefore provide a continuing indication of the new speed which the governor is now set to maintain.

While certain presently-preferred embodiments of the invention have been described in detail above and illustrated in the accompanying drawings, it is to be understood that various modifications, omissions and adaptations which differ from the disclosed embodiments may be adopted by those skilled in the art to which it relates, and it is intended hereby to cover all such changes which come within the scope of the appended claims.

Having described my invention, I claim:

1. In combination with a vehicle speed governor including speed-set means selectively operable by the vehicle driver to set the vehicle speed to be maintained by the governor, and a speedometer with a movable main indicator for indicating the vehicle speed, the improvement which comprises:
   an auxiliary indicator on said speedometer;
   a yieldable coupling acting between said indicators to cause said auxiliary indicator to follow said main indicator;
   and means controlled by the driver's operation of said speed-set means for locking said auxiliary indicator against movement so as to provide a continuing indication of the vehicle speed for which the governor has been set.

2. The combination of claim 1, wherein said main and auxiliary indicators are pointers, and said yieldable coupling comprises spring means acting between said pointers and urging said auxiliary pointer into alignment with said main pointer.

3. The combination of claim 2, wherein said speedometer has a rotatable drive shaft connected to said main pointer to turn the latter angularly in accordance with the vehicle speed, and said auxiliary pointer is freely rotatable on said shaft.

4. The combination of claim 2, wherein said means for locking the auxiliary pointer comprises a spring-applied, electrically-released brake.

5. The combination of claim 4, wherein said brake comprises a solenoid coil and a movable core, a brake member connected to said core for frictional engagement with said auxiliary pointer when the core is in an extended position, a fixed reaction member positioned for frictional engagement by said brake member when the core is in said extended position, spring means urging said core to its extended position to force said brake member against said auxiliary pointer and against said reaction member so as to hold said auxiliary pointer against movement, and said coil being energizable to retract the core from its extended position so as to release said brake member from said auxiliary pointer to permit the latter to follow the main pointer.

6. The combination of claim 2, wherein said means for locking the auxiliary pointer comprises an electrically-applied brake.

7. The combination of claim 6, wherein said brake comprises a solenoid coil, a housing for said coil, and a magnetically attractable brake member inductively coupled to said coil beyond said housing and connected to said auxiliary pointer, said coil being energizable to attract said brake member into frictional, braking engagement with said housing to lock the auxiliary pointer against movement.

8. In combination with a vacuum-operated speed governor for a vehicle including a vacuum release valve, a coil for said vacuum release valve energizable to close the latter to enable the governor to regulate the vehicle speed, vehicle speed-sensing means, a vacuum control valve, a lock-in coil energizable to couple said speed-sensing means to the vacuum control valve, a speed-set switch having normally-closed contacts for completing an energization circuit for said lock-in coil and normally-open contacts for completing an energization circuit for said coil for the vacuum release valve, and means providing a holding circuit for maintaining said coil for the vacuum release valve energized after its initial energization through said normally-open contacts of the speed-set switch when the latter is operated to close said normally-open contacts, the improvement which comprises a speedometer having a movable main pointer for indicating the vehicle speed and an auxiliary pointer, and spring means yieldably coupling said pointers to one another for movement of the auxiliary pointer with the main pointer; and means connected to said speed-set switch for locking said auxiliary pointer against movement to provide a continuing indication of the vehicle speed for which the governor has been set.

9. The combination of claim 8, wherein said means for locking the auxiliary pointer comprises a spring-applied, electrically-released brake including a coil connected to said normally-open contacts of the speed set switch
   (a) to be energized for releasing the brake to enable the auxiliary pointer to follow the main pointer when said normally-open contacts of the speed set switch are closed to energize the coil for the vacuum release valve, and
   (b) to be de-energized to permit the brake to be applied to lock the auxiliary pointer against movement when said normally-open contacts of the speed set switch re-open and said normally-closed contacts of the speed set switch re-close to energize said lock-in coil.

10. The combination of claim 9 and further comprising:
    a normally-open speed resume switch connected to said coil for the vacuum release valve and operable when closed to complete an energization circuit for said coil for the vacuum release valve independent of the speed set switch;

and a rectifier connected between said speed resume switch and said brake coil to prevent energization of the brake coil through the speed resume switch when the latter is closed.

11. The combination of claim 9, and further comprising:
a control switch having normally-closed contacts connected to the brake coil to provide an energization circuit for the latter independent of said speed set switch, said control switch having normally-open contacts connected ahead of said speed-set switch and operable when closed to complete an energization circuit to said speed-set switch.

12. The combination of claim 11, and further comprising:
a rectifier connected between said brake coil and said coil for the vacuum release valve to prevent said coil for the vacuum release valve from being energized through said normally-closed contacts of said control switch.

13. The combination of claim 11 and further comprising:
a normally-open speed resume switch connected to said coil for the release valve and operable when closed to complete an energization circuit for said coil for the vacuum release valve independent of said speed set switch;
a first rectifier connected between said coil for the vacuum release valve and the brake coil and having a polarity effective to prevent energization of the brake coil through the speed resume switch when the latter is closed;
a second rectifier of opposite polarity connected in series between said first rectifier and said brake coil to prevent energization of the coil for the vacuum release valve through the normally-closed contacts of said control switch;
and one of said normally-open contacts of the speed set switch being connected to the juncture between said rectifiers to complete energization circuits for both the brake coil and the coil for the vacuum release valve when said normally-open contacts of the speed set switch are closed.

14. The combination of claim 13, wherein said brake comprises a solenoid having a coil and a movable core, a brake disc connected to said core for frictional engagement with the auxiliary pointer when the core is in an extended position, a fixed reaction member positioned for frictional engagement by said brake disc when the core is in said extended position, spring means urging said core to its extended position to force said brake disc against said auxiliary pointer and against said reaction member so as to hold the auxiliary pointer against movement, and said last-mentioned coil being energizable to retract the core from its extended position to release said brake disc from said auxiliary pointer to permit the latter to follow the main pointer.

15. The combination of claim 8, wherein said means for locking the auxiliary pointer comprises an electrically-applied brake including a solenoid coil connected to said normally-closed contacts of the speed set switch
  (a) to be de-energized for releasing the brake to permit the auxiliary pointer to follow the main pointer when said normally-open contacts of the speed set switch are closed to energize the coil for the vacuum release valve, and
  (b) to be energized for applying the brake to hold the auxiliary pointer stationary when said normally-closed contacts of the speed set switch are closed to energize the lock-in coil.

16. The combination of claim 15, wherein said brake comprises a solenoid coil, a housing for said solenoid coil, and a magnetically attractable brake disc inductively coupled to said coil and connected to said auxiliary pointer, said coil being energizable to retract said brake disc into frictional braking engagement with said housing to lock the auxiliary pointer against movement.

References Cited

UNITED STATES PATENTS

| | | | |
|---|---|---|---|
| 2,728,072 | 12/1955 | Magid | 340—263 |
| 2,822,881 | 2/1958 | Treharne | 180—110 |
| 3,041,997 | 7/1962 | Hartwell | 116—129 |
| 3,381,771 | 5/1968 | Granger | 180—110 |

JAMES J. GILL, Primary Examiner

HERBERT GOLDSTEIN, Assistant Examiner

U.S. Cl. X.R.

180—110; 340—53, 263